US012190847B2

(12) United States Patent
Lee et al.

(10) Patent No.: US 12,190,847 B2
(45) Date of Patent: Jan. 7, 2025

(54) REDUCING 3D LOOKUP TABLE INTERPOLATION ERROR WHILE MINIMIZING ON-CHIP STORAGE

(71) Applicant: ATI Technologies ULC, Markham (CA)

(72) Inventors: Keith Lee, Markham (CA); David I. J. Glen, Toronto (CA); Jie Zhou, Markham (CA); Yuxin Chen, Markham (CA)

(73) Assignee: ATI Technologies ULC, Markham (CA)

(*) Notice: Subject to any disclaimer, the term of this patent is extended or adjusted under 35 U.S.C. 154(b) by 0 days.

(21) Appl. No.: 17/407,981

(22) Filed: Aug. 20, 2021

(65) Prior Publication Data

US 2021/0383772 A1 Dec. 9, 2021

Related U.S. Application Data

(63) Continuation of application No. 16/289,260, filed on Feb. 28, 2019, now Pat. No. 11,100,889.

(51) Int. Cl.
*G09G 5/02* (2006.01)
*G09G 5/06* (2006.01)

(52) U.S. Cl.
CPC ....... *G09G 5/06* (2013.01); *G09G 2320/0666* (2013.01)

(58) Field of Classification Search
CPC ............. G09G 5/06; G09G 2320/0666; G09G 2320/0242; G09G 2340/06; G09G 5/02
(Continued)

(56) References Cited

U.S. PATENT DOCUMENTS 10,152,772 B2 12/2018 Fainstain
10,992,938 B2 4/2021 Saeedi et al.
(Continued)

OTHER PUBLICATIONS

"Co-occurrence matrix", Wikipedia.org, Sep. 7, 2016, 2 pages, https://en.wikipedia.org/wiki/Co-occurrence_matrix. [Retrieved Jul. 31, 2018].
(Continued)

*Primary Examiner* — Gordon G Liu
(74) *Attorney, Agent, or Firm* — Kowert, Hood, Munyon, Rankin & Goetzel, P.C.; Rory D. Rankin

(57) ABSTRACT

Systems, apparatuses, and methods for reducing three dimensional (3D) lookup table (LUT) interpolation error while minimizing on-chip storage are disclosed. A processor generates a plurality of mappings from a first gamut to a second gamut at locations interspersed throughout a 3D representation of the pixel component space. For example, in one implementation, the processor calculates mappings for 17×17×17 vertices within the 3D representation. Other implementations can include other numbers of vertices. Rather than increasing the number of vertices to reduce interpolation error, the processor calculates mappings for centroids of the sub-cubes defined by the vertices within the 3D representation of the first gamut. This results in a smaller increase to the LUT size as compared to increasing the number of vertices. The centroid mappings are used for performing tetrahedral interpolation to map source pixels in the first gamut into the second gamut with a reduced amount of interpolation error.

20 Claims, 11 Drawing Sheets

(58) Field of Classification Search
USPC .......................................................... 345/590
See application file for complete search history.

(56) References Cited

U.S. PATENT DOCUMENTS

| | | | | |
|---|---|---|---|---|
| 11,100,889 | B2 | 8/2021 | Lee et al. | |
| 2004/0096104 | A1* | 5/2004 | Terekhov | H04N 1/6058 358/518 |
| 2005/0047504 | A1 | 3/2005 | Sung et al. | |
| 2007/0041026 | A1 | 2/2007 | Tin | |
| 2007/0046691 | A1 | 3/2007 | Presley et al. | |
| 2010/0128976 | A1 | 5/2010 | Stauder et al. | |
| 2014/0269919 | A1 | 9/2014 | Rodriguez | |
| 2014/0376624 | A1 | 12/2014 | Li et al. | |
| 2015/0055706 | A1 | 2/2015 | Xu et al. | |
| 2015/0256850 | A1 | 9/2015 | Kottke et al. | |
| 2017/0236306 | A1* | 8/2017 | Kuchnio | G06T 11/001 382/128 |
| 2018/0109804 | A1 | 4/2018 | Saeedi | |
| 2019/0027082 | A1* | 1/2019 | Van Belle | G09G 3/2003 |
| 2019/0045210 | A1 | 2/2019 | Guermazi et al. | |

OTHER PUBLICATIONS

International Search Report and Written Opinion in International Application No. PCT/IB2019/057945, mailed Dec. 9, 2019, 8 pages.

* cited by examiner

REDUCING 3D LOOKUP TABLE INTERPOLATION ERROR WHILE MINIMIZING ON-CHIP STORAGE

CROSS REFERENCE TO RELATED APPLICATIONS

This application is a continuation of U.S. patent application Ser. No. 16/289,260, now U.S. Pat. No. 11,100,889, entitled "REDUCING 3D LOOKUP TABLE INTERPOLATION ERROR WHILE MINIMIZING ON-CHIP STORAGE", filed Feb. 28, 2019, the entirety of which is incorporated herein by reference.

BACKGROUND

Description of the Related Art

Many types of computer systems include display devices to display images, video streams, and data. Accordingly, these systems typically include functionality for generating and/or manipulating images and video information. In digital imaging, the smallest item of information in an image is called a "picture element" and more generally referred to as a "pixel." To represent a specific color on a typical electronic display, each pixel can have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luminance, or brightness, of a pixel and Cb and Cr correspond to two color-difference chrominance components, representing the blue-difference (Cb) and red-difference (Cr).

Display devices are used to view images produced by digital processing devices such as desktop computers, laptop computers, televisions, mobile phones, smart phones, tablet computers, digital cameras, and other devices. A wide variety of technologies including cathode-ray tubes (CRTs), liquid crystal displays (LCDs), plasma display panels, and organic light emitting diodes (OLEDs) are used to implement display devices. Consequently, different display devices are able to represent colors within different gamuts. As used herein, the term "gamut" refers to a complete subset of colors that can be accurately represented by a particular display device.

Furthermore, the same color, as perceived by the human eye, can be represented by different numerical values in different gamuts. For example, the RGB color system is commonly used in computer graphics to represent colors of pixels in images. The same color might be represented by different RGB values in different gamuts. Consequently, gamut mapping is used to map color values between different gamuts so that the perceived colors generated using the color values are the same in different devices. However, gamut mapping typically incurs some amount of interpolation error, and techniques for reducing interpolation error suffer from various shortcomings.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
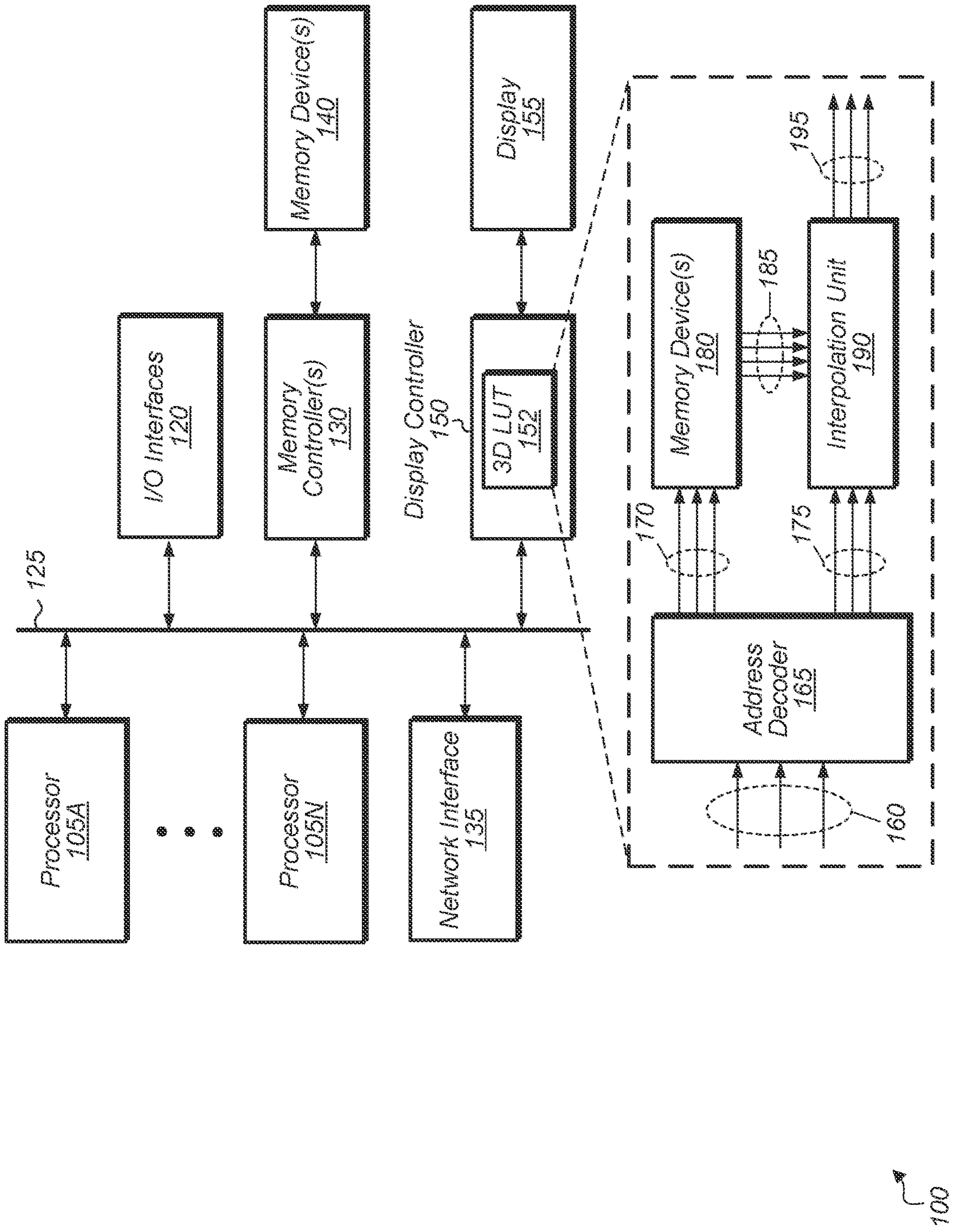
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for reducing three dimensional (3D) lookup table (LUT) interpolation error while minimizing on-chip storage are disclosed herein. A display controller receives source pixel data encoded in a first gamut. In one implementation, the display controller uses a 3D LUT to convert the source pixel data from the first gamut to a second gamut associated with a target display. However, due to the finite nature of the storage capacity of the memory structures containing the 3D LUT, interpolation error is introduced when converting from the first gamut to the second gamut. The interpolation error can be reduced by increasing the number of mapping points (i.e., vertices) stored in the 3D LUT, but this comes at a cost of increased on-chip storage.

In various implementations, one of the objectives of the techniques described herein is to reduce interpolation error without significantly increasing the on-chip storage requirements of the 3D LUT. Accordingly, in one implementation, rather than significantly increasing the number of vertices and the size of the LUT, the display controller stores mappings for centroids of the sub-cubes of the 3D representation of the gamut translation space. As used herein, the term "centroid" is defined as the geometric center of a sub-cube or other geometric shape (e.g., tetrahedron or otherwise). For example, the centroid of a cube is the point within the cube that is equidistant from each face of the cube.

In one implementation, when an input pixel is received by the display controller, the display controller identifies which sub-cube contains the input pixel. The mapping of the centroid of the sub-cube is retrieved along with mappings of the corresponding vertices of the sub-cube. The display controller uses the centroid mapping and vertex mappings to convert the input pixel from the first gamut to the second gamut. By using the centroid rather than only vertices of the sub-cube, the interpolation error is reduced when converting the input pixel from the first gamut to the second gamut. In one implementation, the display controller performs tetrahedral interpolation to convert the input pixel from the first gamut to the second gamut using the vertices and centroid of the sub-cube which contains the input pixel. In other implementations, the display controller performs other types of interpolation, including, but not limited to prism interpolation, trilinear interpolation, tricubic interpolation, radial interpolation, or any combination thereof.

In one implementation, rather than adding entries to the lookup table for centroid mappings of all sub-cubes of the 3D-representation of the gamut translation space, the display controller stores centroid mappings for only those sub-cubes which have an interpolation error greater than a threshold. In this way, for pixel locations within sub-cubes that have an interpolation error less than or equal to the threshold, traditional interpolation will be used to convert these pixel locations to the second gamut. Traditional interpolation uses four vertices of the sub-cube to interpolate to a second gamut representation for an interior point that falls within the tetrahedra defined by those four vertices. For pixel locations within sub-cubes that have an interpolation error greater than the threshold, interpolation using the centroid and three vertices of the sub-cube is performed. The smaller size of the tetrahedra bounded by the centroid and three vertices of the sub-cube results in a reduced gamut-conversion error as compared to performing traditional interpolation using four vertices of the sub-cube. This helps to mitigate the gamut-conversion error that is introduced when converting from the first gamut to the second gamut for pixels within sub-cubes that have more than a threshold amount of interpolation error.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides a plurality of pixels to display controller 150 to be driven to display 155. In this implementation, processor 105N can convert pixels of a source frame from a first gamut to a second gamut associated with display 155. Alternatively, in another implementation, display controller 150 converts pixels of the source frame from the first gamut to the second gamut associated with display 155 and may include color assignment, scaling, alpha blending, and/or other functions. In this implementation, display controller 150 includes three-dimensional (3D) lookup table (LUT) 152 and any combination of hardware (e.g., control logic, processing elements) and/or software for converting pixels of the source frame from the first gamut to the second gamut. While 3D LUT 152 is shown as being located within display controller 150, it should be understood that in other implementations, 3D LUT 152 can be located elsewhere in system 100.

In one implementation, 3D LUT 152 includes the components illustrated in the expanded box shown below display controller 150. In other implementations, 3D LUT 152 includes other components in other suitable arrangements. In one implementation, the logic for converting input pixels from a first gamut to a second gamut includes address decoder 165, memory device(s) 180 storing pixel component values in the second gamut, and interpolation unit 190. Address decoder 165 receives the pixel components 160 of an input pixel in the first gamut. In one implementation, pixel components 160 are N-bit red, green, and blue values for the input pixel, where N is a positive integer. Address decoder 165 conveys pixel components 170 to the appropriate memory device(s) 180. In one implementation, pixel components 170 are the M most significant bits (MSBs) of pixel components 160, where M is a positive integer. Pixel components 170 are used to identify the sub-cube or other geometric shape which bounds the input pixel in a 3D representation of the first gamut space. A lookup of memory device(s) 180 is performed using pixel components 170 to retrieve values of pixel components in a second gamut for vertices and one or more interior points 185 of this sub-cube or other geometric shape.

The retrieved pixel component values (in the second gamut) of vertices and interior point(s) 185 are conveyed to interpolation unit 190. Also, address decoder 165 conveys pixel components 175 to interpolation unit 190. In one implementation, pixel components 175 are the (N−M) least significant bits (LSBs) of pixel components 160. Interpolation unit 190 performs interpolation using vertices and interior point(s) 185 and pixel components 175 to generate the pixel components 195 which represent the input pixel in the second gamut. Additional details on the gamut conversion process will be provided throughout the remainder of this disclosure.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device (s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express)

bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
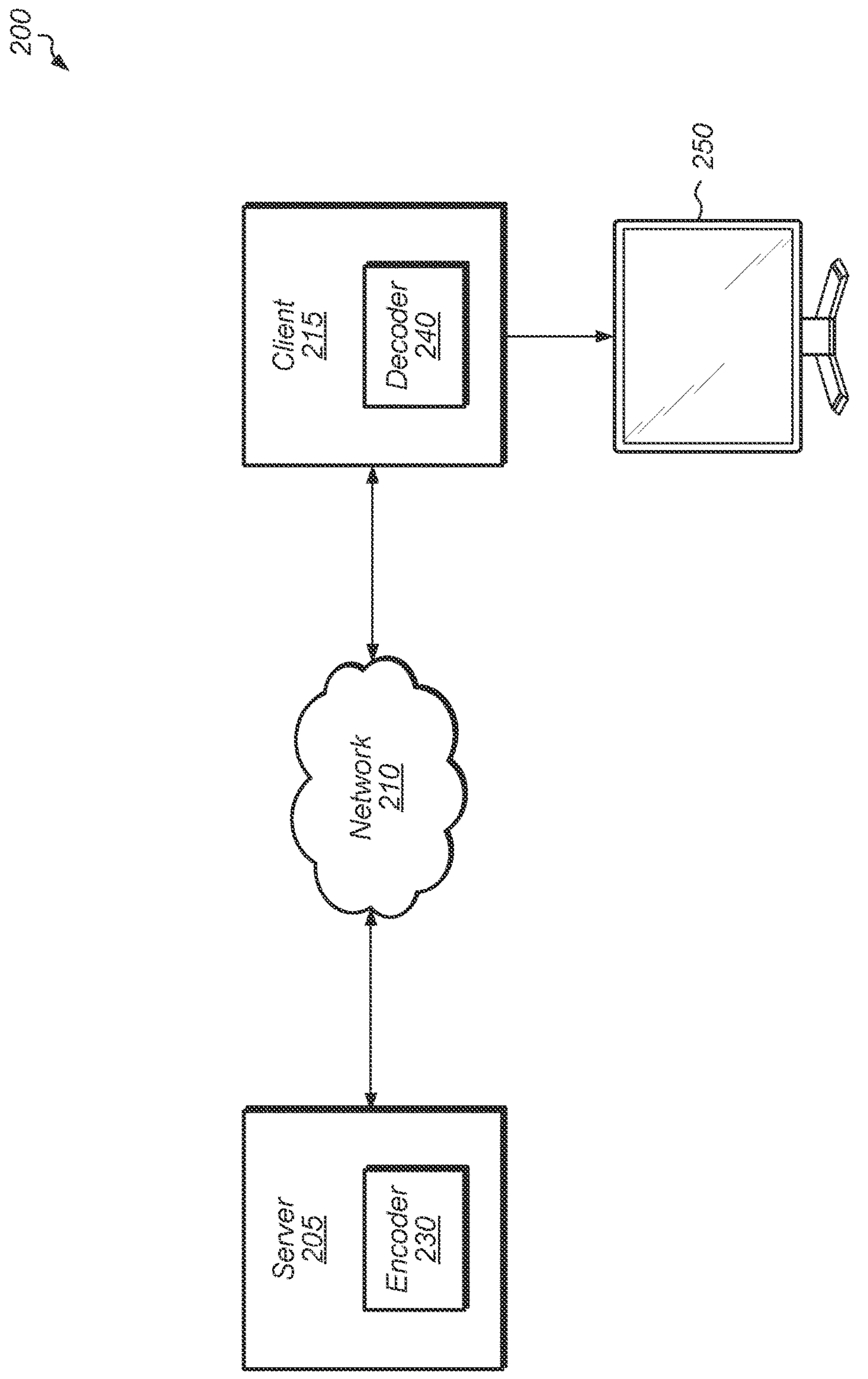
FIG. 2 is a block diagram of one implementation of a system for encoding a video bitstream which is sent over a network.

Turning now to FIG. 2, a block diagram of one implementation of a system 200 for encoding a video bitstream which is sent over a network is shown. System 200 includes server 205, network 210, client 215, and display 250. In other implementations, system 200 can include multiple clients connected to server 205 via network 210, with the multiple clients receiving the same bitstream or different bitstreams generated by server 205. System 200 can also include more than one server 205 for generating multiple bitstreams for multiple clients. In one implementation, server 205 receives video or image frames in a first gamut and then encoder 230 converts the frames into a second gamut as part of the encoding process, where the second gamut is associated with display 250. The encoded bitstream is then conveyed to client 215 via network 210. Decoder 240 on client 215 decodes the encoded bitstream and generates video frames or images to drive to display 250.

Network 210 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 210 further includes remote direct memory access (RDMA) hardware and/or software, transmission control protocol/internet protocol (TCP/IP) hardware and/or software, router, repeaters, switches, grids, and/or other components.

Server 205 includes any combination of software and/or hardware for rendering video/image frames and/or encoding the frames into a bitstream. In one implementation, server 205 converts input video/image frames from a first gamut into a second gamut which is associated with display 250. Server 205 includes one or more processors which execute any number of software applications. Server 205 also includes network communication capabilities, one or more input/output devices, and/or other components. The processor(s) of server 205 include any number and type (e.g., graphics processing units (GPUs), CPUs, DSPs, FPGAs, ASICs) of processors. The processor(s) are coupled to one or more memory devices storing program instructions executable by the processor(s). Similarly, client 215 includes any combination of software and/or hardware for decoding a bitstream and driving frames to display 250. In one implementation, client 215 includes one or more software applications executing on one or more processors of one or more computing devices. Client 215 can be a computing device, game console, mobile device, streaming media player, or other type of device.

Figure 3:
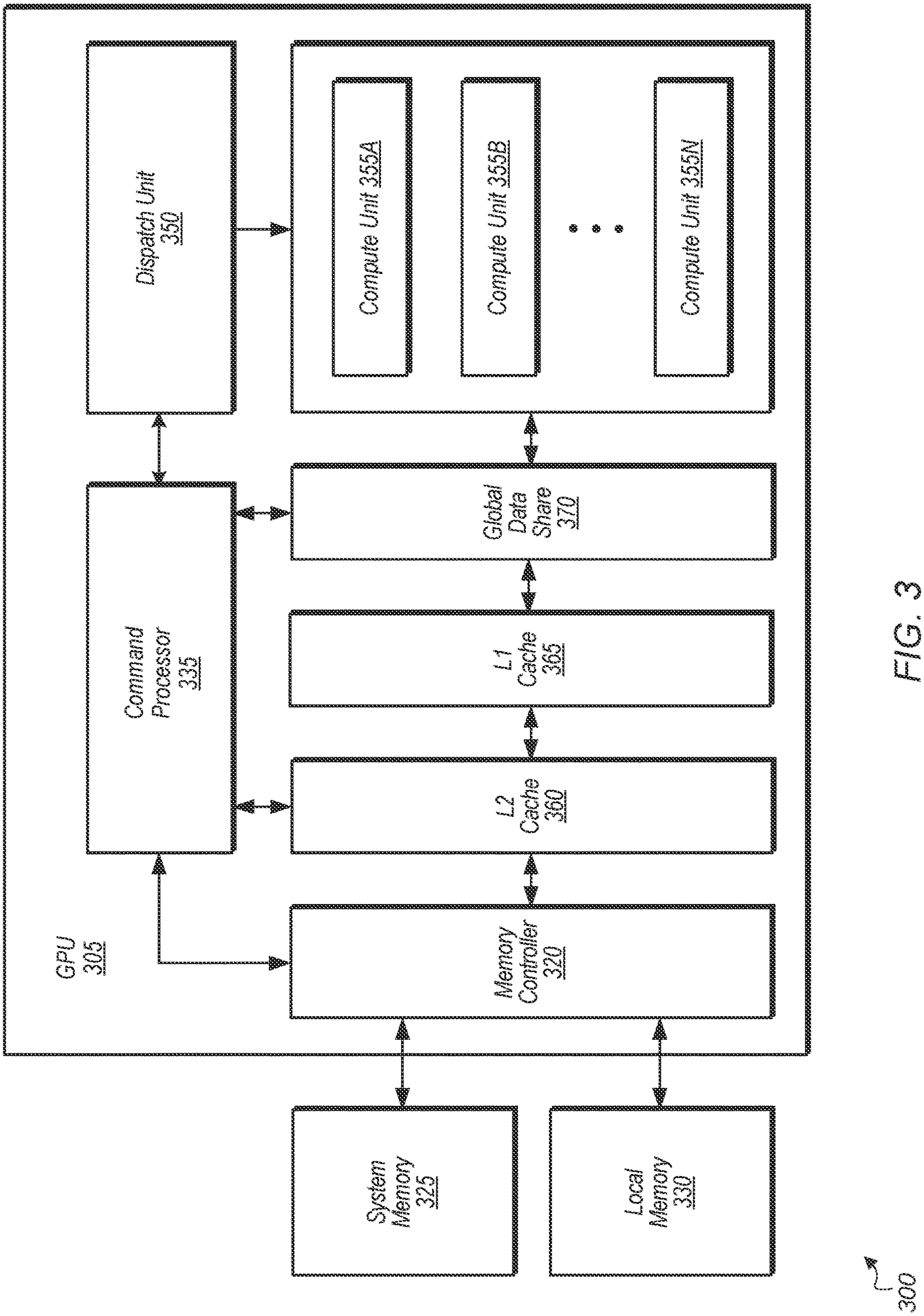
FIG. 3 is a block diagram of another implementation of computing system.

Referring now to FIG. 3, a block diagram of another implementation of a computing system 300 is shown. In one implementation, system 300 includes GPU 305, system memory 325, and local memory 330. System 300 also includes other components which are not shown to avoid obscuring the figure. GPU 305 includes at least command processor 335, dispatch unit 350, compute units 355A-N, memory controller 320, global data share 370, level one (L1) cache 365, and level two (L2) cache 360. In other implementations, GPU 305 includes other components, omits one or more of the illustrated components, has multiple instances of a component even if only one instance is shown in FIG. 3, and/or is organized in other suitable manners.

In various implementations, computing system 300 executes any of various types of software applications. In one implementation, as part of executing a given software application, a host CPU (not shown) of computing system 300 launches kernels to be performed on GPU 305. Command processor 335 receives kernels from the host CPU and issues kernels to dispatch unit 350 for dispatch to compute units 355A-N. Threads within kernels executing on compute units 355A-N read and write data to global data share 370, L1 cache 365, and L2 cache 360 within GPU 305. Although not shown in FIG. 3, in one implementation, compute units 355A-N also include one or more caches and/or local memories within each compute unit 355A-N.

Figure 4:
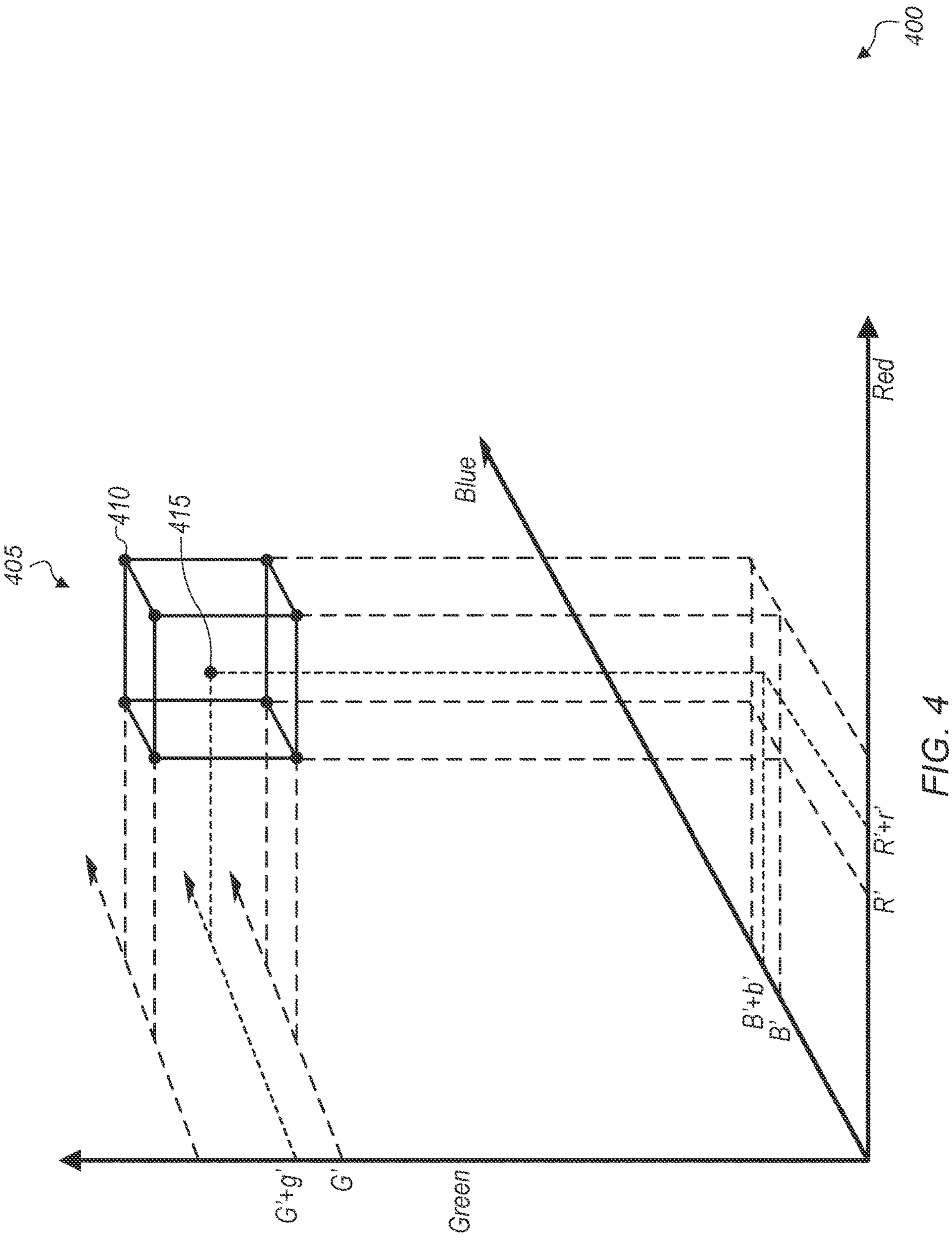
FIG. 4 illustrates a diagram of one implementation of a portion of a lattice that represents a 3-D LUT.

Referring now to FIG. 4, a diagram of one implementation of a portion 400 of a lattice that represents a 3-D LUT is shown. In the interest of clarity, a single cube 405 from the lattice is shown in the portion 400. The cube 405 is defined by a set of vertices 410 (only one indicated by a reference numeral in the interest of clarity) in the lattice. It is noted that cube 405 can also be referred to herein as a "sub-cube". Each vertex 410 is addressed or identified by pixel component values in a first gamut. For the purposes of the discussion associated with FIG. 4, the lattice is represented in the red-green-blue (RGB) color space. However, in other implementations, a lattice can be represented in other color spaces (e.g., YCbCr, XYZ, Lab). As shown in FIG. 4, the three axes of the lattice correspond to the Red, Green, and Blue color components. For other color spaces, each axis of the lattice is associated with a corresponding component specific to the given color space. Each vertex 410 of cube 405 is identified based on the color component values. In one implementation, the color component values (R, G, B) of the vertices of the lattice are equal to a value indicated by a number (m) of MSBs of the complete color component values.

In a 3D LUT associated with the lattice shown in FIG. 4, each of the vertices 410 of cube 405 is associated with mapped color component values in a second gamut. The color component values associated with the vertices 410 can therefore be used to map input colors in the first gamut to output colors in the second gamut by interpolating from the color component values associated with the vertices 410 to locations indicated by the input color in the first gamut. In some implementations, tetrahedral interpolation is used to determine an output color by interpolating from four of the vertices 410 to the location of the input color. For example, values of the color components in the second gamut associated with four of the vertices 410 can be interpolated to a location 415 in the cube 405 of the lattice that represents the 3-D LUT. The location 415 of an input pixel is indicated by the color components (R'+r', G'+g', B'+b') of the input color of the first gamut. In a conventional 3-D LUT, the color component values (r', g', b') of the input pixel with location 415 are equal to the remaining least significant bits (LSBs) of the input pixel's color component values in the first gamut. In one implementation, a tetrahedron of cube 405 is selected to perform tetrahedral interpolation based on the location 415 indicated by the color component values of the input pixel. For example, in one implementation six tetrahedra are formed by the eight vertices 410 of cube 405. The tetrahedron which contains pixel location 415 will be chosen, and the vertices of this particular tetrahedron will be used for performing the subsequent tetrahedral interpolation. The color component values of the input pixel in the second gamut are then determined by interpolating from these four vertices of the selected tetrahedron to the location 415. In one implementation, in order to reduce the interpolation error with the above approach, tetrahedral interpolation is performed using a tetrahedron formed by three vertices of cube 405 and the centroid (not shown) of cube 405. When the centroid of cube 405 is taken into consideration, cube 405 can be partitioned into twelve tetrahedra using the centroid and the eight vertices 410. This is compared to the six tetrahedra that are formed using only the eight vertices 410. The smaller size of the tetrahedra allow for a reduced interpolation error since the distance from interior points to the vertices of the selected tetrahedron is reduced. More details on techniques for performing tetrahedral interpolation using the centroid of a cube will be provided throughout the remainder of this disclosure.

Figure 5:
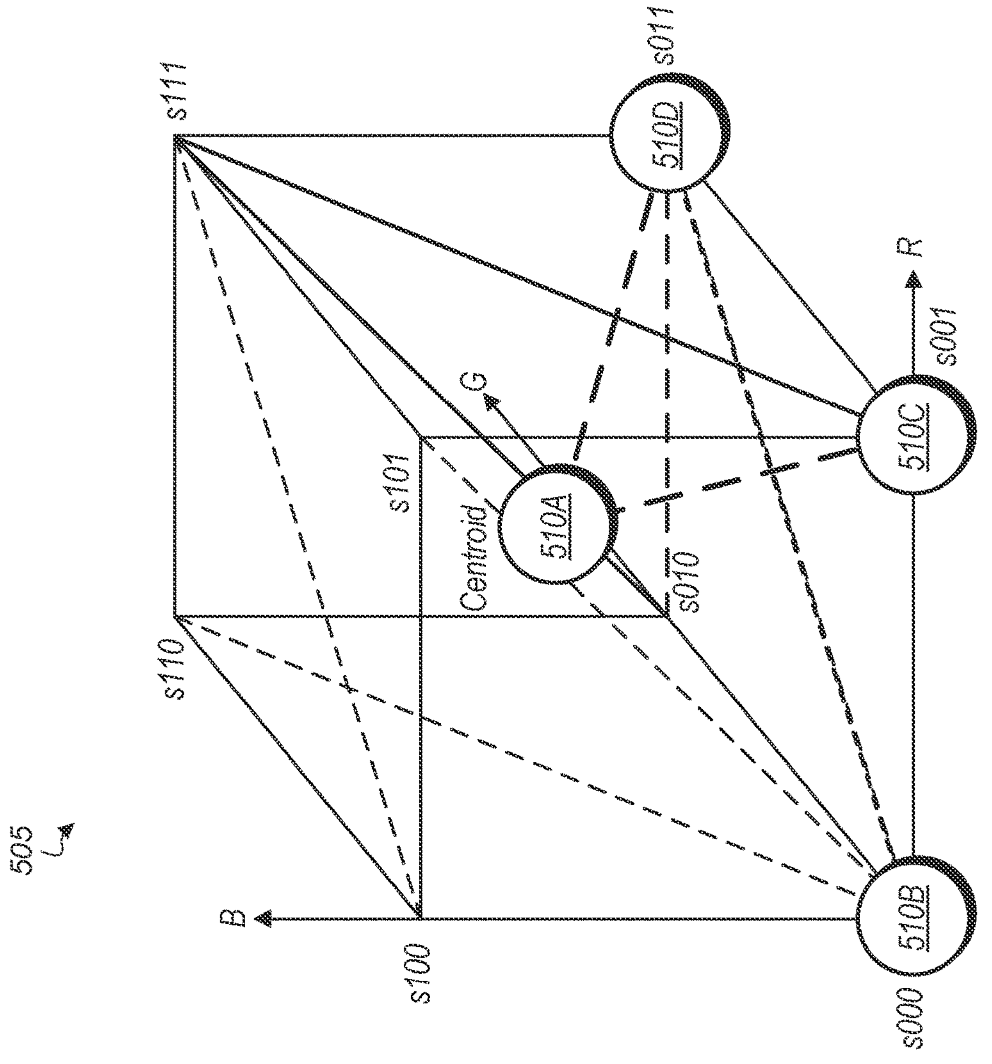
FIG. 5 illustrates a diagram of one implementation of a sub-cube with a centroid.

Referring now to FIG. 5, a diagram of a sub-cube 505 with a centroid 510A is shown. In one implementation, an address decoder of a conventional 3D LUT uses a subset of the most significant bits (MSBs) of the pixel component value (e.g., red, green, or blue) of an input pixel to identify the corresponding vertex in the 3D LUT. Consequently, the number of samples along each of the three dimensions of the 3D LUT is constrained to ($2^m$+1), where m is the number of MSBs used by the address decoder to identify the vertices in the 3D LUT. For example, if m=4 for all three dimensions of the 3D LUT, the total number of vertices in the 3D LUT is 17×17×17 or 4913. Increasing the number of samples and the number of MSBs used by the address decoder to m=5 increases the number of vertices in the 3D LUT to 35,937.

In one implementation, instead of incrementing the value of m and causing the number of vertices per linear dimension to nearly double, a centroid (e.g. centroid 510A of sub-cube 505) can be added to each sub-cube of the 3D LUT. As previously noted, the change from having 17×17×17 vertices in the 3D pixel component space to 33×33×33 vertices increases the number of vertices from 4913 to 35,937. On the other hand, a 17×17×17 3DLUT with entries for 4913 distinct vertices has 16×16×16=4096 sub-cubes. Adding centroids to each sub-cube results in 4913+4096=9009 vertices, which is less than double the original number of vertices In comparison, increasing the vertex density from 17×17×17 to 33x33x33 increases the total number of vertices in the 3D LUT by more than 7 times. Accordingly, adding centroids to each sub-cube can reduce interpolation error while resulting in a smaller increase to the size of the 3D LUT.

Sub-cube 505 shows how the additional centroid 510A is used when performing tetrahedral interpolation. Tetrahedral interpolation involves the look up of the 4 vertices of a tetrahedron for interpolation. For sub-cubes without a centroid, each sub-cube is divided into 6 tetrahedra and 4 vertices of one of the 6 tetrahedra are used for interpolation. When a sub-cube has a centroid, such as sub-cube 505 with centroid 510A, each sub-cube may be divided into 12 tetrahedra and 4 vertices of one of the 12 tetrahedra are used for interpolation. The centroid 510A provides a more accurate interpolation point for interpolation than using four vertices of the sub-cube because the smaller size of the tetrahedra results in a shorter distance from interior points to the vertices. This shorter distance reduces any interpolation error that is generated. Accordingly, using the centroid 510A along with vertices 510B-D when performing interpolation results in a smaller interpolation error as compared to using four vertices of the sub-cube 505.

Figure 6:
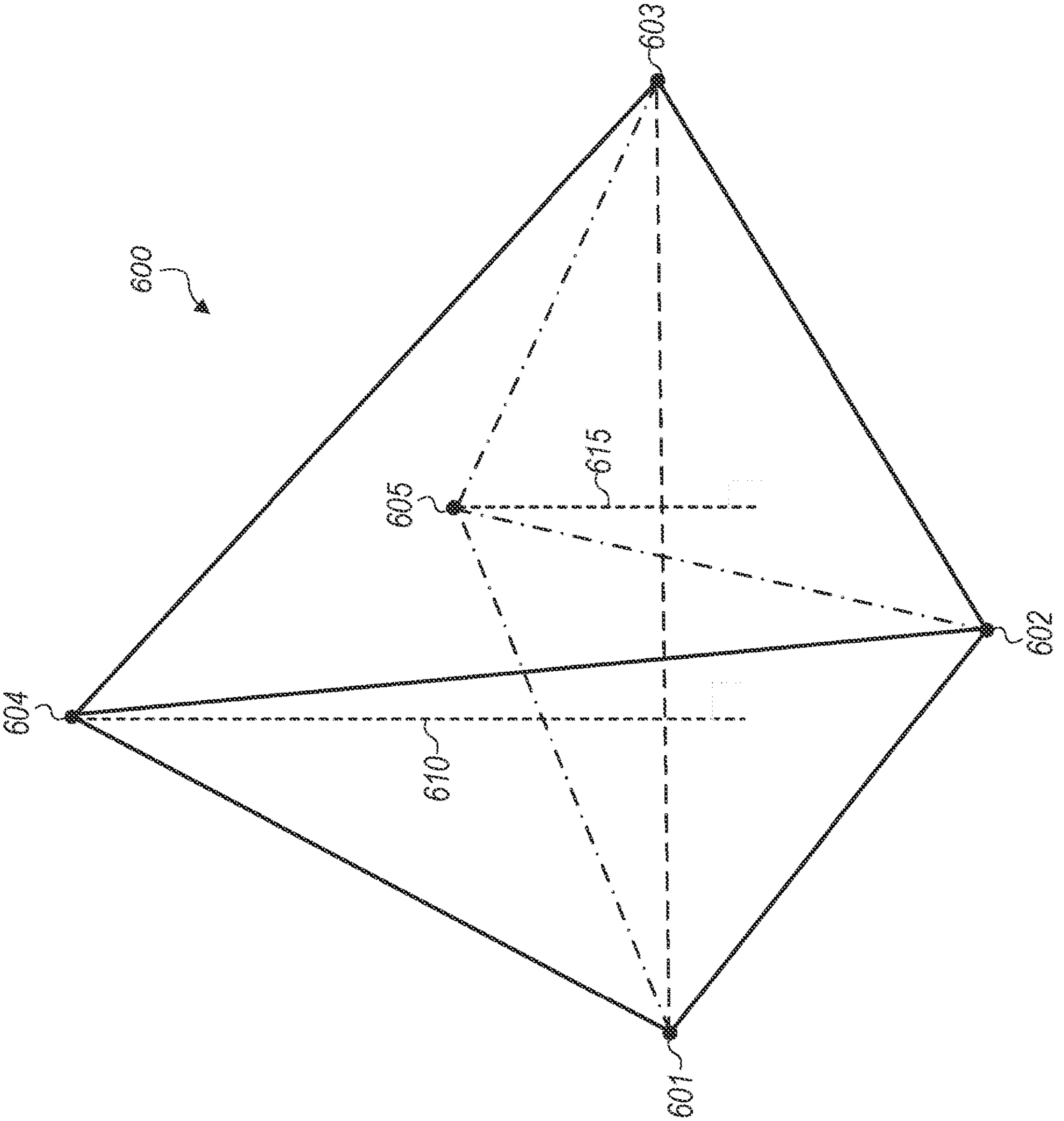
FIG. 6 illustrates a diagram of one implementation of a performing tetrahedral interpolation.

Turning now to FIG. 6, a diagram of one implementation of performing tetrahedral interpolation is shown. In one implementation, a processing unit receives a source input pixel 605 to be converted from a source gamut to a target gamut of a display. It is assumed for the purposes of this discussion that the source input pixel 605 is located within tetrahedron 600 in a corresponding sub-cube within the 3D representation of the source gamut. Twelve tetrahedra are formed within the corresponding sub-cube based on the eight vertices of the sub-cube and the centroid 604. It is also assumed for the purposes of this discussion that tetrahedron 600 is formed using three vertices 601-603 and the centroid 604 of the corresponding sub-cube.

To convert the source input pixel 605 from the source gamut to the target gamut, the processing unit retrieves mappings for three vertices 601, 602, and 603 and the mapping for centroid 604 from one or more 3D LUTs. The mappings store pixel component values for at least the target gamut. The vertices 601-603 and centroid 604 can also be referred to as the points A, B, C, D, respectively, and the associated pixel component values in the target gamut can be referred to as $O_A$, $O_B$, $O_C$, $O_D$, respectively. Also, the source input pixel 605 can also be referred to as point I.

The interpolated output value for a source pixel that maps to the input point 605 (also referred to as the input point I) is given by:

$$O_I=(V_A*O_A+V_B*O_B+V_C*O_C+V_D*O_D)/V$$

where V is the volume of the tetrahedron 600 and $V_i$(i=A, B, C, D) is the volume for a sub-tetrahedron A, B, C, D, respectively. For example, $V_D$ is the volume for a sub-tetrahedron D bounded by the points IABC. The volumes $V_D$ and V share the same bottom surface ABC, and so the above equation can be rewritten as:

$$O_I=O_A*h_A/H_A+O_B*h_B/H_B+O_C*h_C/H_C+O_D*h_D/H_D$$

where $H_i$(i=A, B, C, D) is the height of the tetrahedron 600 from the vertex i and B, C, D) is the height of the sub-tetrahedron (A, B, C, D) from input point 605. For example, the height 610 is equivalent to $H_D$ and the height 615 is equivalent to $h_D$. Output weights are defined as:

$$wi=(h_i*\Delta)/H_i$$

where Δ is the length of a side of the cube. The output value $O_I$ can then be written as:

$$O_I=(w_A*O_A+w_B*O_B+w_C*O_C+w_D*O_D)/\Delta$$

It should be understood that the above is merely one example of a technique for performing tetrahedral interpolation using three vertices and a centroid of a sub-cube to calculate the pixel component values for a source pixel in the target gamut. In other implementations, other interpolation techniques using three vertices and a centroid of a sub-cube can be employed. By using the centroid of the sub-cube rather than a fourth vertex of the sub-cube when performing tetrahedral interpolation, the interpolation error is reduced when calculating the pixel component values in the target gamut.

Figure 7:
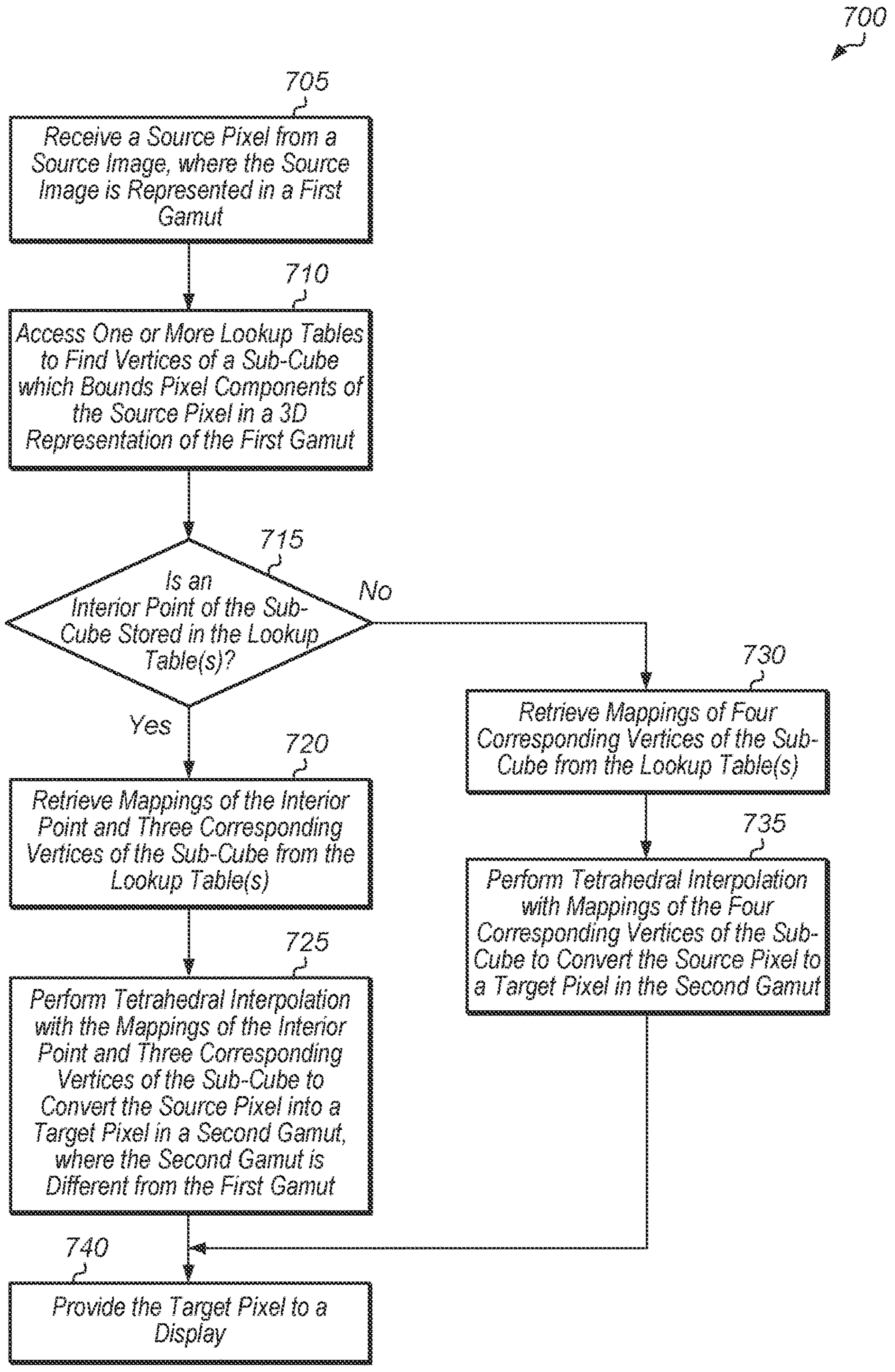
FIG. 7 is a generalized flow diagram illustrating one implementation of a method for reducing three dimensional (3D) lookup table interpolation error while minimizing on-chip storage.
Figure 8:
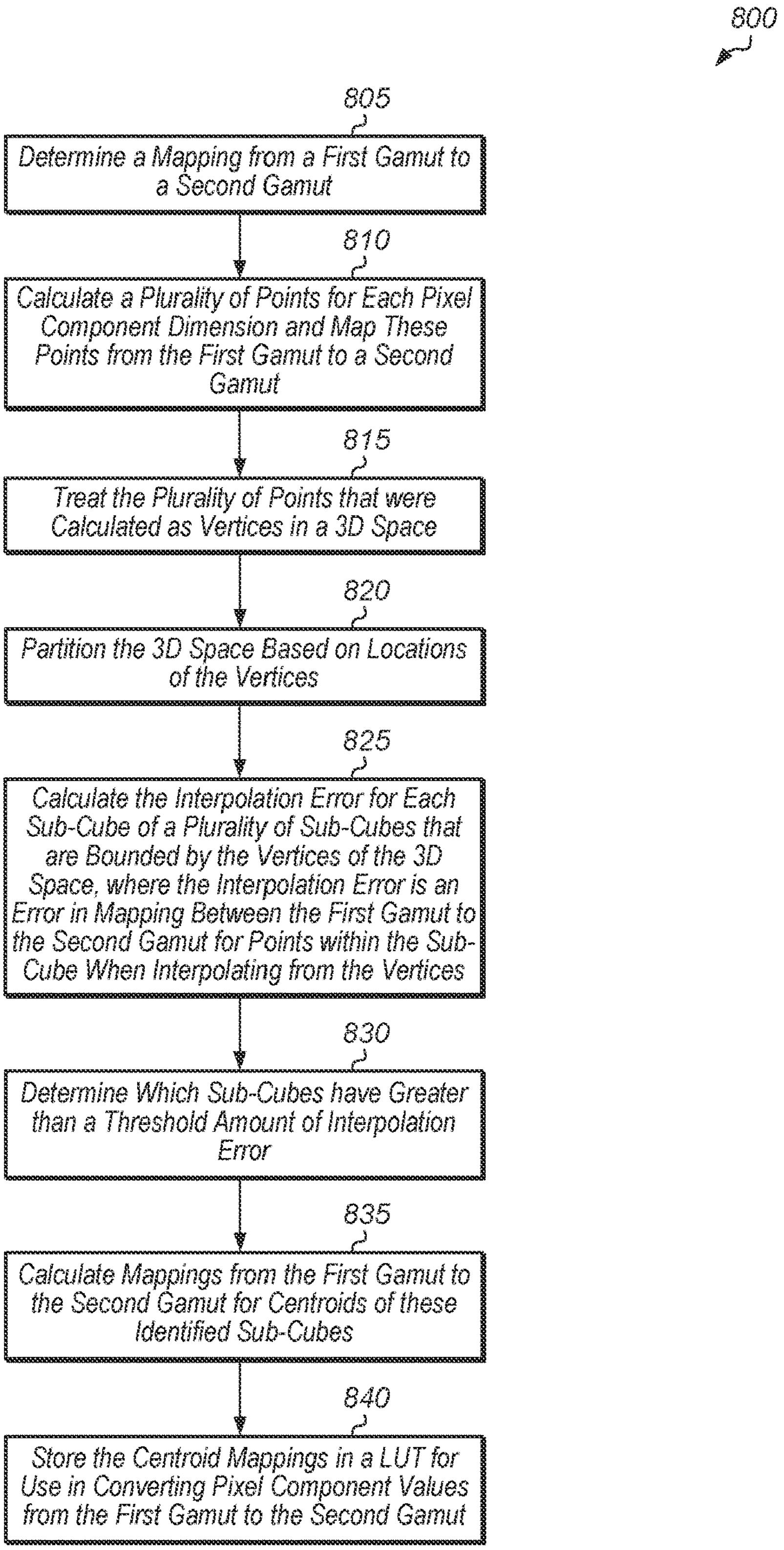
FIG. 8 is a generalized flow diagram illustrating one implementation of a method for storing mappings of centroids in a 3D LUT for sub-cubes with greater than a threshold amount of interpolation error.
Figure 9:
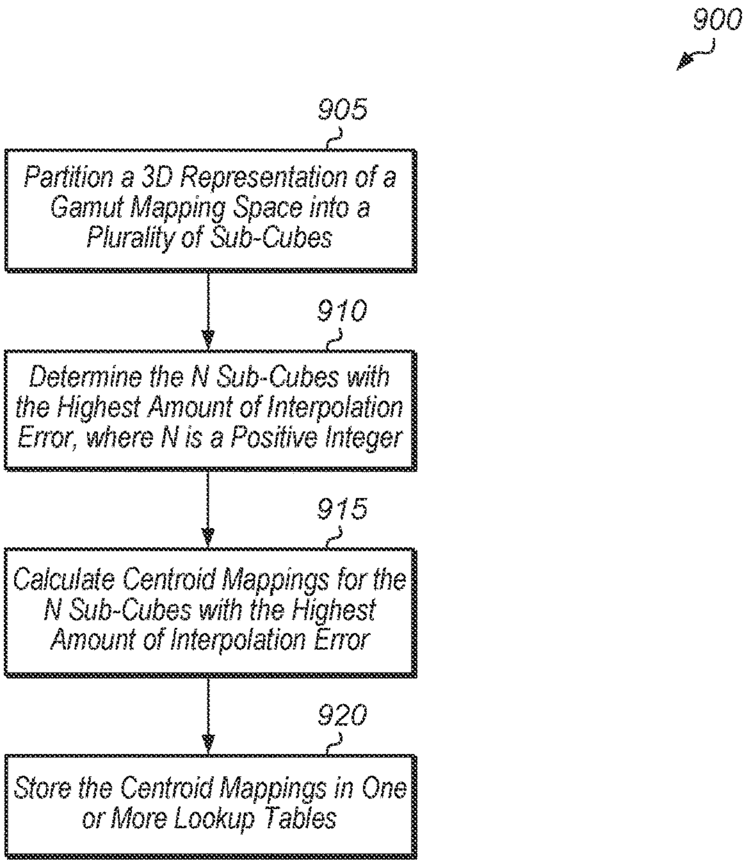
FIG. 9 is a generalized flow diagram illustrating one implementation of a method for calculating centroid mappings for a particular number of sub-cubes.
Figure 10:
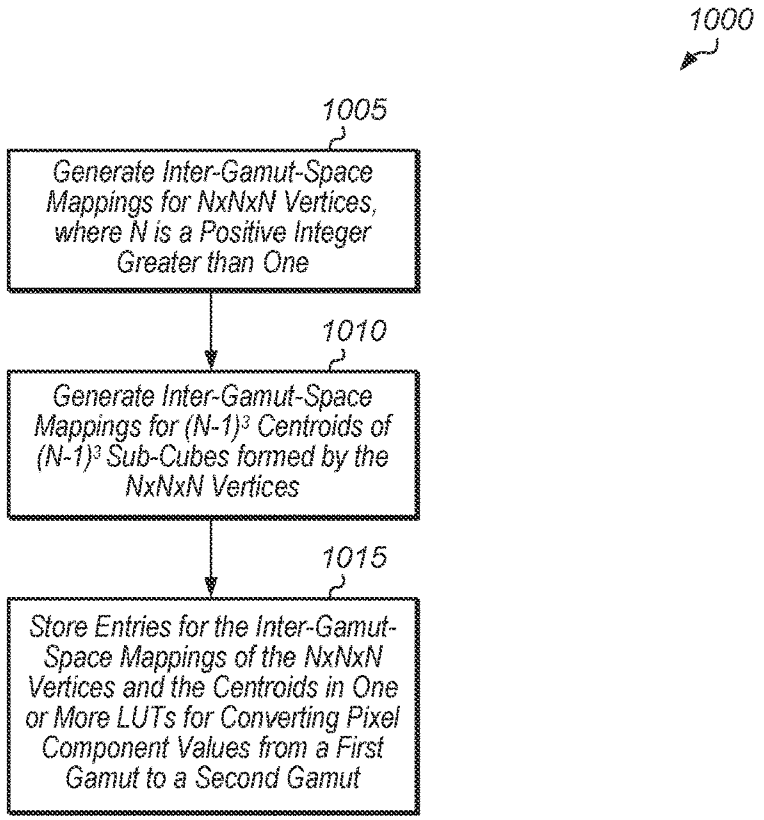
FIG. 10 is a generalized flow diagram illustrating one implementation of a method for utilizing optimized inter-gamut-space mapping LUT(s).

Referring now to FIG. 7, one implementation of a method 700 for reducing three dimensional (3D) lookup table interpolation error while minimizing on-chip storage is shown. For purposes of discussion, the steps in this implementation and those of FIG. 8-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A display controller receives a source pixel from a source image, where the source image is represented in a first gamut (block 705). Next, the display controller accesses one or more lookup tables to find vertices of a sub-cube which bounds pixel components of the source pixel in a three dimensional (3D) representation of the first gamut (block 710). It is assumed for the purposes of this discussion that the lookup table(s) store a plurality of entries, where each entry includes a mapping from the first gamut to a second gamut, where the second gamut is associated with a display on which the source image will be displayed. In another implementation, the display controller finds the vertices of another type of geometric shape (e.g., tetrahedron, rectangular prism) in block 710 that bounds the pixel components of the source pixel.

Then, the display controller determines whether an interior point of the sub-cube is stored in the lookup table(s) (conditional block 715). In one implementation, the interior point is a centroid of the sub-cube. In other implementations, the interior point is not located at the centroid of the sub-cube. For example, in another implementation, the sub-cube includes multiple interior points stored in the lookup table(s). In this implementation, the display controller selects the interior point which is closest to the source pixel. In a further implementation, the interior point is located on a boundary surface of the sub-cube (or other geometric shape). Accordingly, an interior point can be defined as any point within the geometric shape (e.g., sub-cube) or on a boundary surface of the geometric shape that is not a vertex of the geometric shape.

If an interior point of the sub-cube is stored in the lookup table(s) (conditional block 715, "yes" leg), then the display controller retrieves mappings of the interior point and three corresponding vertices of the sub-cube from the lookup table(s) (block 720). Alternatively, if multiple interior points are stored in the lookup table(s), the display controller could retrieve mappings of two or more interior points and some number of vertices of the sub-cube in block 720. Next, the display controller performs tetrahedral interpolation with the mappings of the interior point and three corresponding vertices of the sub-cube to convert the source pixel to a target pixel in a second gamut, where the second gamut is different from the first gamut (block 725). Then, the display controller provides the target pixel to a display (block 740). Alternatively, the display controller can write the target pixel to a memory device in block 740, or the display controller can convey the target pixel to another functional unit for additional processing in block 740.

If the sub-cube does not have a interior point stored in the lookup table(s) (conditional block 715, "no" leg), then the display controller retrieves mappings of four corresponding vertices of the sub-cube from the lookup table(s) (block 730). Next, the display controller performs tetrahedral interpolation with the mappings of the four corresponding vertices of the sub-cube to convert the source pixel to a target pixel in the second gamut (block 735). Then, the display controller provides the target pixel to a display (block 740). After block 740, method 700 ends. It is noted that method 700 can be performed for each source pixel of the source image.

Turning now to FIG. 8, one implementation of a method 800 for storing mappings of centroids in a 3D LUT for sub-cubes with greater than a threshold amount of interpolation error is shown. A processing unit determines a mapping from a first gamut to a second gamut (block 805). The processing unit can determine the mapping in response to receiving a source image or video frame to encode in preparation for display. For example, a source image or video frame is encoded according to the first gamut, and a display is capable of displaying the source image or video frame according to the second gamut. Next, the processing unit calculates a plurality of points for each pixel component dimension and maps these points from the first gamut to a second gamut (block 810). For example, in one implementation, the processing unit calculates 17 points for each pixel component dimension and maps these points from the first gamut to the second gamut. For the RGB color space, the dimensions refer to red, green, and blue. In other implementations, the processing unit calculates other numbers of points for each pixel component dimension.

Then, the processing unit treats the plurality of points that were calculated as vertices in a 3D space (block 815). Next, the processing unit partitions the 3D space based on locations of the vertices (block 820). Then, the processing unit calculates the interpolation error for each sub-cube of a plurality of sub-cubes that are bounded by the plurality of vertices of the 3D space, where the interpolation error is an error in mapping between the first gamut to the second gamut for points within the sub-cube when interpolating from the vertices (block 825). For example, in one implementation, the processing unit calculates the interpolation error at N separate points within the sub-cube when mapping from the first gamut to the second gamut using interpolation from the vertices, where N is a positive integer. The processing unit can then calculate the sum of the interpolation error for the N separate points, calculate the maximum of the interpolation error for the N separate points, or otherwise. Based on the technique utilized, the processing unit can generate a measure or score of the interpolation error for each sub-cube.

Next, the processing unit determines which sub-cubes have greater than a threshold amount of interpolation error (block 830). For example, in one implementation, the processing unit compares the sum of the interpolation error for the N points within each sub-cube to a threshold. In other implementations, the processing unit uses other techniques to determine if the interpolation error of a sub-cube is greater than the threshold. Then, the processing unit calculates mappings from the first gamut to the second gamut for centroids of these identified sub-cubes (block 835). Next, the processing unit stores the centroid mappings in a LUT for use in converting pixel component values from the first gamut to the second gamut (block 840). For example, the centroid mappings can be utilized when performing tetrahedral interpolation to convert pixel component values from the first gamut to the second gamut. After block 840, method 800 ends.

Referring now to FIG. 9, one implementation of a method 900 for calculating centroid mappings for a particular number of sub-cubes is shown. A processing unit partitions a 3D representation of a gamut mapping space into a plurality of sub-cubes (block 905). Next, the processing unit determines the N sub-cubes with the highest amount of interpolation error, where N is a positive integer (block 910). In one implementation, the value of N is determined by the number of remaining available entries in one or more lookup tables after mappings for all of the vertices of the gamut mapping space have been stored. For example, in one implementation, if the lookup tables have a total capacity of 4928 entries, and the number of vertices in the gamut mapping space is equal to 4913, then N would be equal to 15 (i.e., 4928−4913). After block 910, the processing unit calculates centroid mappings for the N sub-cubes with the highest amount of interpolation error (block 915). Next, the processing stores the centroid mappings in one or more lookup tables (block 920). After block 920, method 900 ends.

Turning now to FIG. 10, one implementation of a method 1000 for utilizing optimized inter-gamut-space mapping LUT(s) is shown. A processing unit generates inter-gamut-space mappings for N×N×N vertices, where N is a positive integer greater than one (block 1005). Also, the processing unit generates inter-gamut-space mappings for $(N-1)^3$ centroids of $(N-1)^3$ sub-cubes formed by the N×N×N vertices (block 1010). In other implementations, the processing unit generates inter-gamut-space mappings for only a subset of the $(N-1)^3$ centroids of the $(N-1)^3$ sub-cubes. The processing unit stores entries for the inter-gamut-space mappings of the N×N×N vertices and the $(N-1)^3$ centroids in one or more lookup tables (LUTs) for converting pixel component values from a first gamut to a second gamut (block 1015). In another implementation, the processing unit generates pixel component values for centroids of one or more tetrahedrons within each $(N-1)^3$ sub-cube of the N×N×N vertices in block 1010 and then stores the entries for the centroids of tetrahedrons in the 3D LUT in block 1015. After block 1015, method 1000 ends.

Figure 11:
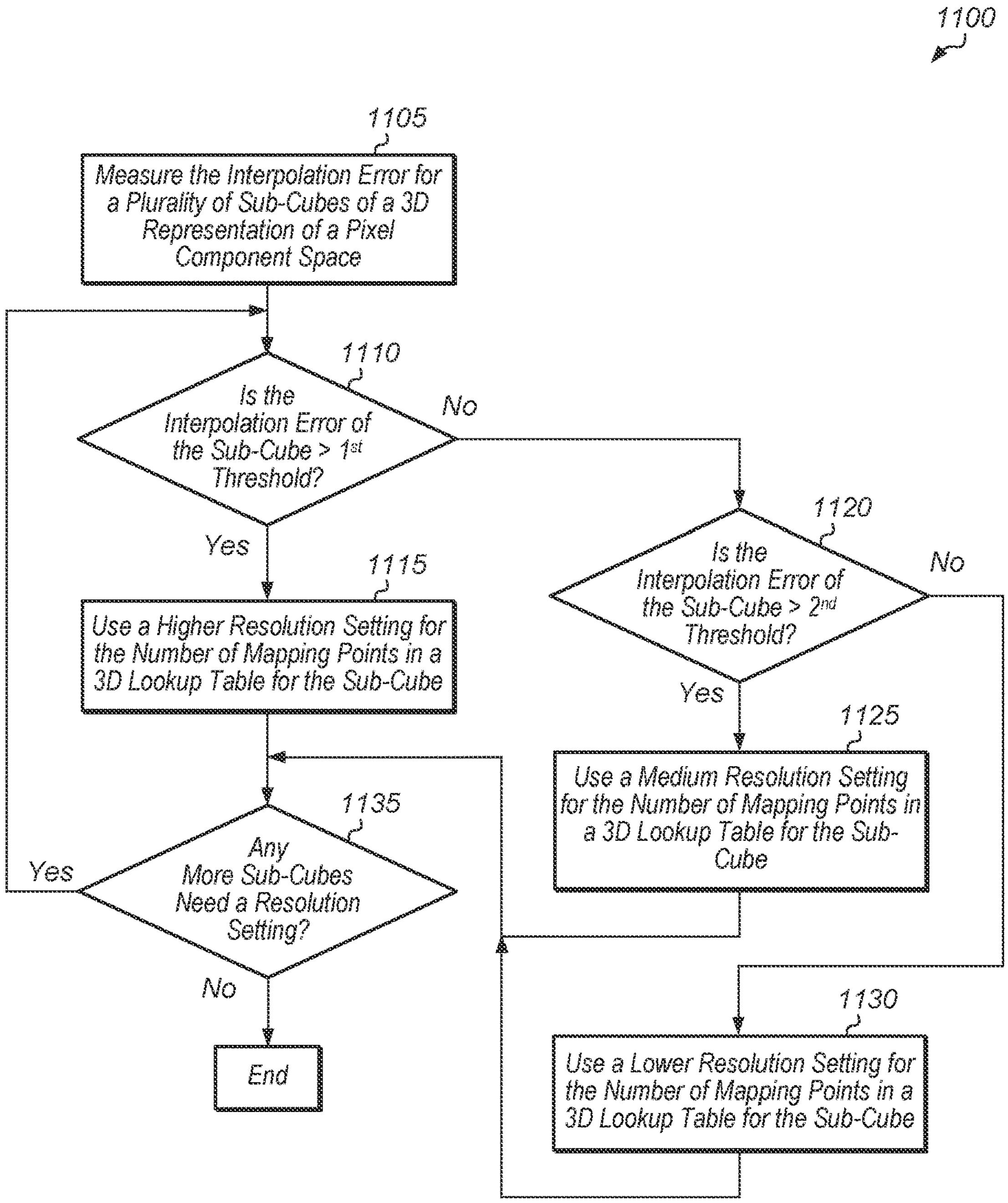
FIG. 11 is a generalized flow diagram illustrating one implementation of a method for using variable resolution of sub-cubes depending on corresponding interpolation error.

Referring now to FIG. 11, one implementation of a method 1100 for using variable resolution of sub-cubes depending on corresponding interpolation error is shown. A processing unit measures the interpolation error for a plurality of sub-cubes of a 3D representation of a pixel component space (block 1105). Alternatively, in another implementation, the processing unit receives previously calculated measurements of the interpolation error for the plurality of sub-cubes in block 1105. It is noted that the number of sub-cubes in the 3D representation of the pixel component space can vary according to the implementation. Also, in another implementation, the processing unit measures the interpolation error for other geometric shapes besides sub-cubes in block 1105.

Then, for each sub-cube, the processing unit determines if the measured interpolation error of the sub-cube is greater than a first threshold (conditional block 1110). If the measured interpolation error of the sub-cube is greater than the first threshold (conditional block 1110, "yes" leg), then the processing unit uses a higher resolution setting for the number of mapping points in a 3D lookup table for the sub-cube (block 1115). For example, in one implementation, the higher resolution setting is a highest possible resolution setting, with the highest possible resolution setting being 8×8×8 in one particular implementation. In other implementations, the higher resolution setting can be any of various other values. In one implementation, the processing unit divides a sub-cube into eight or more level 2 sub-cubes in block 1115. In another implementation, the processing unit divides a tetrahedron into four or more tetrahedral in block 1115. In other implementations, the processing unit increases the resolution by other amounts and/or for other types of geometric shapes in block 1115.

If the measured interpolation error of the sub-cube is less than or equal to the first threshold (conditional block 1110, "no" leg), then the processing unit determines if the measured interpolation error of the sub-cube is greater than a second threshold (conditional block 1120). If the measured interpolation error of the sub-cube is greater than the second first threshold (conditional block 1120, "yes" leg), then the processing unit uses a medium resolution setting for the number of mapping points in a 3D lookup table for the sub-cube (block 1125). For example, in one implementation, the medium resolution setting is 5×5×5. In other implementations, the medium resolution setting can be any of various other values. It is assumed for the purposes of this discussion that the medium resolution setting is less than the higher resolution setting. If the measured interpolation error of the sub-cube is less than or equal to the second threshold (conditional block 1120, "no" leg), then the processing unit uses a lower resolution setting for the number of mapping points in a 3D lookup table for the sub-cube (block 1130). For example, in one implementation, the lower resolution setting is 2×2×2. In other implementations, the lower resolution setting can be any of various other values. It is assumed for the purposes of this discussion that the lower resolution setting is less than the medium resolution setting. After blocks 1115, 1125, and 1130, if there are any other sub-cubes for which a resolution setting needs to be calculated (conditional block 1135, "yes" leg), then method 1100 returns to conditional block 1110. Otherwise, if resolution settings have already been determined for all of the sub-cubes (conditional block 1135, "no" leg), then method 1100 ends.

It should be understood that in other implementations, the processing unit can compare the interpolation error to more than two different thresholds. In these implementations, the processing unit can have more than three different resolution settings. Also, in some implementations, rather than comparing the interpolation error of a sub-cube to one or more thresholds, the processing unit uses a formula to convert interpolation error into a resolution setting for the sub-cube. In other words, the processing unit sets a resolution of a number of mapping points in a 3D lookup table for the sub-cube which is proportional to the interpolation error of the sub-cube. Accordingly, the higher the interpolation error is for a given sub-cube, the higher the resolution will be for the given sub-cube.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
partitioning a three dimensional (3D) representation of a gamut mapping space into a plurality of sub-cubes;
calculating centroid mappings for N sub-cubes of the plurality of sub-cubes, in response to determining that the N sub-cubes have an interpolation error that exceeds a threshold, wherein a centroid mapping for a given sub-cube corresponds to a geometric center of the given sub-cube; and
providing a target pixel to a display, based at least in part on the centroid mappings.

2. The method of claim 1, comprising:
receiving a first source pixel from a source image, wherein the source image is represented in a first gamut; and
converting the first source pixel to the target pixel in a second gamut, wherein the second gamut is different from the first gamut.

3. The method of claim 2, comprising storing the centroid mappings in a table.

4. The method as recited in claim 3, accessing the table to find mappings for vertices of a geometric shape that bounds pixel components of the first source pixel in a 3D representation of a pixel component space.

5. The method as recited in claim 4, comprising:
in response to determining an interior point of the geometric shape is stored in the table, retrieving mappings of the interior point and three corresponding vertices of the geometric shape from the table;
in response to determining an interior point of the geometric shape is not stored in the table, retrieving mappings of four corresponding vertices of the geometric shape from the table; and
performing interpolation on mappings retrieved from the table to convert the first source pixel to the target pixel.

6. The method as recited in claim 5, wherein the interpolation is tetrahedral interpolation.

7. The method as recited in claim 1, comprising:
using a first resolution setting for a number of mapping points when calculating the centroid mappings, in response to determining the interpolation error is greater than a first threshold; and
using a second resolution setting for a number of mapping points when calculating the centroid mappings, in response to determining the interpolation error is not greater than the first threshold, wherein the second resolution setting is lower than the first resolution setting.

8. An apparatus comprising:
a processing unit comprising circuitry configured to:
partition a three dimensional (3D) representation of a gamut mapping space into a plurality of sub-cubes;
calculate centroid mappings for N sub-cubes of the plurality of sub-cubes, in response to determining that the N sub-cubes have an interpolation error that exceeds a threshold, wherein a centroid mapping for a given sub-cube corresponds to a geometric center of the given sub-cube; and
provide a target pixel to a display, based at least in part on the centroid mappings.

9. The apparatus of claim 8, wherein the processing unit is configured to:
receive a first source pixel from a source image, wherein the source image is represented in a first gamut; and
convert the first source pixel to the target pixel in a second gamut, wherein the second gamut is different from the first gamut.

10. The apparatus of claim 9, wherein the processing unit is configured to store the centroid mappings in a table.

11. The apparatus as recited in claim 10, wherein the processing unit is configured to access the table to find mappings for vertices of a geometric shape that bounds pixel components of the first source pixel in a 3D representation of a pixel component space.

12. The apparatus as recited in claim 11, wherein the processing unit is configured to:
in response to a determination that an interior point of the geometric shape is stored in the table, retrieve mappings of the interior point and three corresponding vertices of the geometric shape from the table;
in response to a determination that an interior point of the geometric shape is not stored in the table, retrieve mappings of four corresponding vertices of the geometric shape from the table; and
perform interpolation on values retrieved from the table to convert the first source pixel to the target pixel.

13. The apparatus as recited in claim 12, wherein the interpolation is tetrahedral interpolation.

14. The apparatus as recited in claim 8, wherein the processing unit is configured to:
use a first resolution setting for a number of mapping points when calculating the centroid mappings, in response to determining the interpolation error is greater than a first threshold; and
use a second resolution setting for a number of mapping points when calculating the centroid mappings, in response to determining the interpolation error is not greater than the first threshold, wherein the second resolution setting is lower than the first resolution setting.

15. A system comprising:
a processor comprising circuitry configured to calculate centroid mappings for N sub-cubes corresponding to a three dimensional (3D) representation of a gamut mapping space, wherein a centroid mapping for a given sub-cube corresponds to a geometric center of the given sub-cube; and
a display controller comprising circuitry configured to:
receive a first source pixel from a source image, wherein the source image is represented in a first gamut;
identify vertices of a geometric shape that bounds pixel components of the first source pixel in a 3D representation of a pixel component space;
convert the first source pixel to a target pixel in a second gamut, wherein the second gamut is different from the first gamut; and
provide the target pixel to a display.

16. The system as recited in claim 15, wherein the processor is configured to access the centroid mappings to identify vertices of a geometric shape that bounds pixel components of the first source pixel in a 3D representation of a pixel component space.

17. The system as recited in claim 16, wherein the processor is configured to partition a three dimensional (3D) representation of the gamut mapping space into a plurality of sub-cubes.

18. The system as recited in claim 17, wherein the display controller comprises a table configured to store the mappings.

19. The system as recited in claim 18, wherein the display controller is configured to perform interpolation on mappings retrieved from the table to generate the target pixel.

20. The system as recited in claim 19, wherein the display controller is configured to:

in response to determining an interior point of the geometric shape is stored in the table, retrieve mappings of the interior point and three corresponding vertices of the geometric shape from the table;

in response to determining an interior point of the geometric shape is not stored in the table, retrieve mappings of four corresponding vertices of the geometric shape from the table; and perform interpolation on values retrieved from the table to convert the first source pixel to the target pixel.

* * * * *